(12) United States Patent
Davidson et al.

(10) Patent No.: US 6,775,360 B2
(45) Date of Patent: Aug. 10, 2004

(54) METHOD AND SYSTEM FOR PROVIDING TEXTUAL CONTENT ALONG WITH VOICE MESSAGES

(75) Inventors: Jason Alan Davidson, Forest Grove, OR (US); Thomas J. Hernandez, Portland, OR (US); Shuvranshu Pokhariyal, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 337 days.

(21) Appl. No.: 09/749,598

(22) Filed: Dec. 28, 2000

(65) Prior Publication Data

US 2002/0085690 A1 Jul. 4, 2002

(51) Int. Cl.$^7$ ............................................. H04M 11/00
(52) U.S. Cl. ................. 379/88.14; 379/88.12; 379/88.17; 379/52; 455/557; 704/235
(58) Field of Search .......................... 379/88.12, 88.13, 379/88.14, 88.15, 88.17, 52, 88.01, 88.02; 455/557; 704/235

(56) References Cited

U.S. PATENT DOCUMENTS

| | | | | |
|---|---|---|---|---|
| 5,623,539 A | * | 4/1997 | Bassenyemukasa et al. | ..... 379/88.02 |
| 5,963,618 A | * | 10/1999 | Porter | ..................... 704/270.1 |
| 6,104,789 A | * | 8/2000 | Lund | ........................ 379/93.23 |
| 6,138,036 A | * | 10/2000 | O'Cinneide | .................. 455/557 |
| 6,173,259 B1 | * | 1/2001 | Bijl et al. | .................... 704/235 |
| 6,307,921 B1 | * | 10/2001 | Engelke et al. | ............... 379/52 |
| 6,353,661 B1 | * | 3/2002 | Bailey, III | ............... 379/93.25 |
| 6,411,685 B1 | * | 6/2002 | O'Neal | .................... 379/88.14 |
| 6,438,216 B1 | * | 8/2002 | Aktas | ....................... 379/88.01 |
| 6,483,899 B2 | * | 11/2002 | Agraharam et al. | ...... 379/88.14 |
| 6,504,910 B1 | * | 1/2003 | Engelke et al. | ............... 379/52 |
| 6,510,206 B2 | * | 1/2003 | Engelke et al. | ............... 379/52 |

* cited by examiner

*Primary Examiner*—Fan Tsang
*Assistant Examiner*—Md S Elahee
(74) *Attorney, Agent, or Firm*—Pillsbury Winthrop LLP

(57) ABSTRACT

A system and method for providing textual content along with voice messages is presented. A caller at a calling station places a call to a callee at a receiving station. The call is placed through a connection, and the receiving station includes a callee's phone linked to a callee's computer. The call is recorded at the calling station to generate voice data. The call is then transcribed based on the voice data to generate the textual content of the call. The textual content is sent by the calling station to a server via the connection. The server then transfers the textual content, as well as voice data received by the server, to an electronic incoming mailbox of the callee as electronic mail.

26 Claims, 5 Drawing Sheets

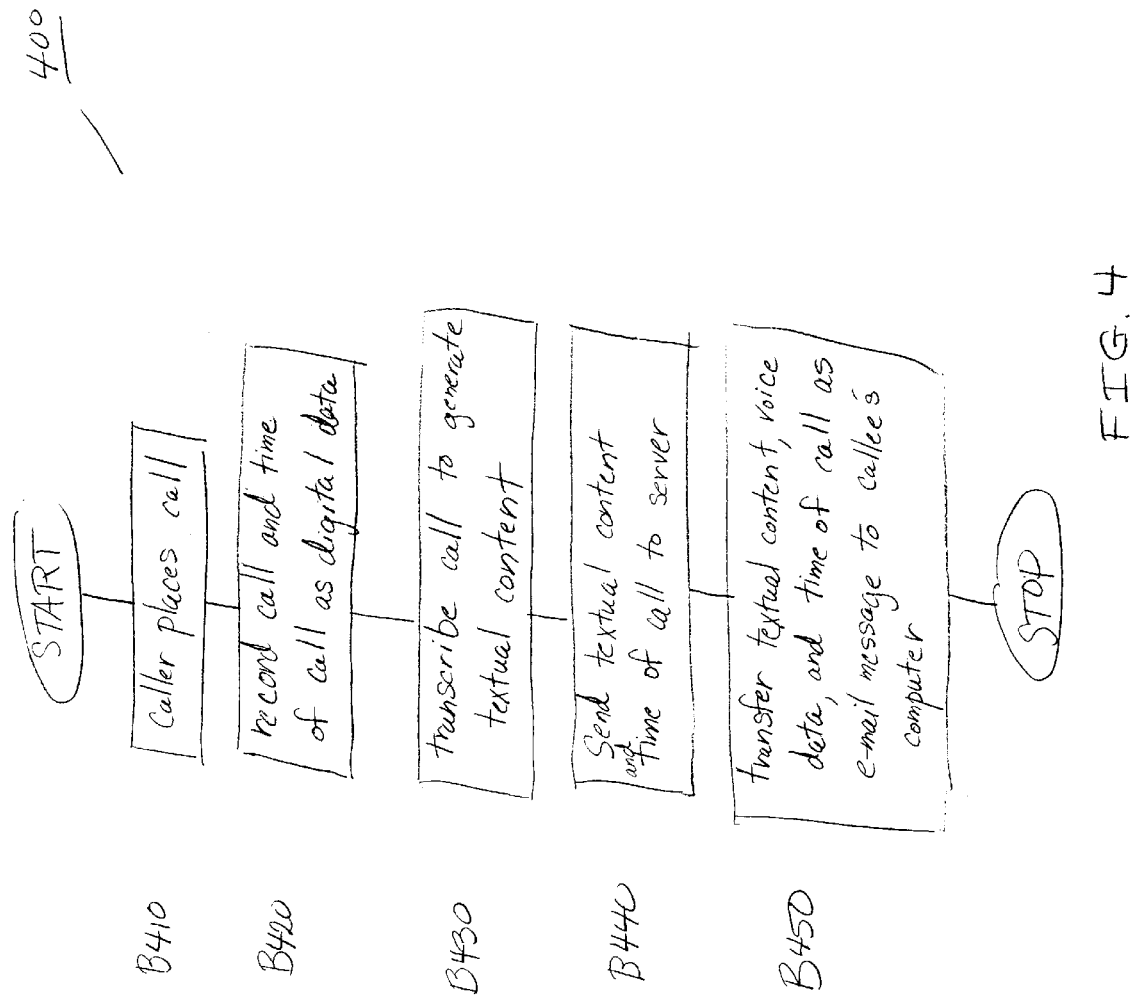

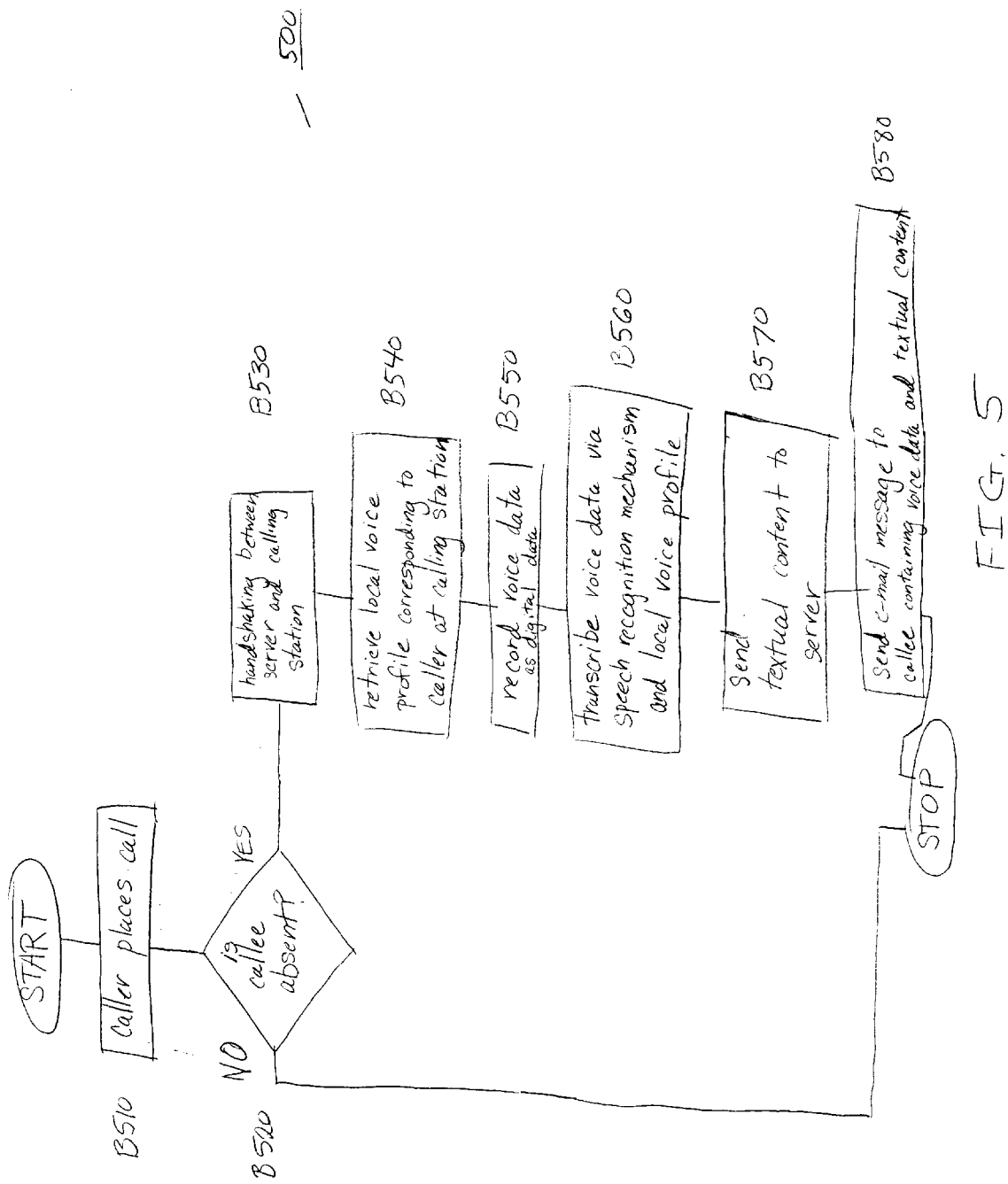

METHOD AND SYSTEM FOR PROVIDING TEXTUAL CONTENT ALONG WITH VOICE MESSAGES

BACKGROUND

1. Field of the Invention

The present invention relates in general to messaging. Specifically, the present inventions relate to methods and systems for unified messaging.

2. General Background and Related Art

In our modern telecommunications era, messaging is carried out in various ways, such as by leaving a phone message or sending electronic mail. To enable efficient message search and retrieval, messages may be indexed according to date received, date sent, sender, subject, etc.

Information management techniques attempt to organize information such that search and retrieval are easy and meaningful. Such techniques have been applied to electronic mail systems. Advanced systems enable users to search e-mail messages based on their content. For example, a user may enter a certain keyword as a search criterion, and the mail system will return a set of all messages that contain the keyword.

Conventional voice messages may be transferred to an electronic mail system as a digital file attachment wherein an audio signal is encoded as a digital representation. One popular form of such files is "*.wav". There are other such waveform files as well. Thus, an audio file, such as a voicemail message, can be sent as an attachment over the Internet. For example, a phone message may be intercepted by a server that detects when the intended recipient of a call is absent. The audio phone message may be digitized to generate a wave signal representation of the voice message, and then sent as an attachment to a pre-specified e-mail address of the recipient. Accordingly, the recipient may be able to access voice messages by means other than calling his voice mail box on the telephone, such as through e-mail. An audio voice mail attachment may be played using appropriate software when the e-mail message to which it is attached is opened by the recipient.

One advantage of sending a voice message as an attachment in an electronic mail system is that the message can be indexed according to certain criteria, such as by date received. As such, the recipient may search and retrieve messages based on the criteria. Such selective search and retrieval of messages is not possible if a voice message is left on a conventional phone. That is, when a voice message is sent to an electronic mail system, some information management techniques may be applied to facilitate message search and retrieval.

However, it is not possible to directly apply information management techniques to the content of voice messages that are sent to electronic systems as attachments. Indeed, the digital waveform exists in its intrinsic signal form instead of in digital textual form. Indexing digital voicemail messages according to their content would be more semantically meaningful to users.

Therefore, what is needed is a method and system that allows users to search and retrieve information based on the content of voicemail messages in an e-mail system.

BRIEF DESCRIPTION OF THE DRAWINGS

FIG. 4 is a flowchart showing a method according to the present invention.

FIG. 5 is a flowchart showing a method according to the present invention.

DETAILED DESCRIPTION

The following detailed description refers to the accompanying drawings that illustrate exemplary embodiments of the claimed inventions. Other embodiments are possible and modifications may be made to the embodiments without departing from the spirit and scope of the invention. Therefore, the following detailed description is not meant to limit the invention. Rather, the scope of the invention is defined by the appended claims.

It will be apparent to one of ordinary skill in the art that the embodiments as described below may be implemented in many different embodiments of software, firmware, and hardware in the entities illustrated in the figures. The actual software code or specialized control hardware used to implement the present invention is not limiting of the present invention. Thus, the operation and behavior of the embodiments will be described without specific reference to the actual software code or specialized hardware components. The absence of such specific references is feasible because it is clearly understood that artisans of ordinary skill would be able to design software and control hardware to implement the embodiments of the present invention based on the description herein.

Moreover, the processes associated with the presented embodiments may be stored in any storage device, such as, for example, a computer system (non-volatile) memory, an optical disk, magnetic tape, or magnetic disk. Furthermore, the processes may be programmed when the computer system is manufactured or via a computer-readable medium at a later date. Such a medium may include any of the forms listed above with respect to storage devices and may further include, for example, a carrier wave modulated, or otherwise manipulated, to convey instructions that can be read, demodulated/decoded and executed by a computer.

A system and method for providing textual content along with voice messages, as described herein, involves a caller at a calling station placing a call to a callee at a receiving station. The call is placed through a connection, and the receiving station includes a callee's phone linked to a callee's computer. The call is recorded at the calling station to generate voice data. The call is then transcribed based on the voice data to generate the textual content of the call. The textual content is sent by the calling station to a server via the connection. The server then transfers the textual content, as well as voice data received by the server, to an electronic incoming mailbox of the callee as electronic mail.

Figure 1:
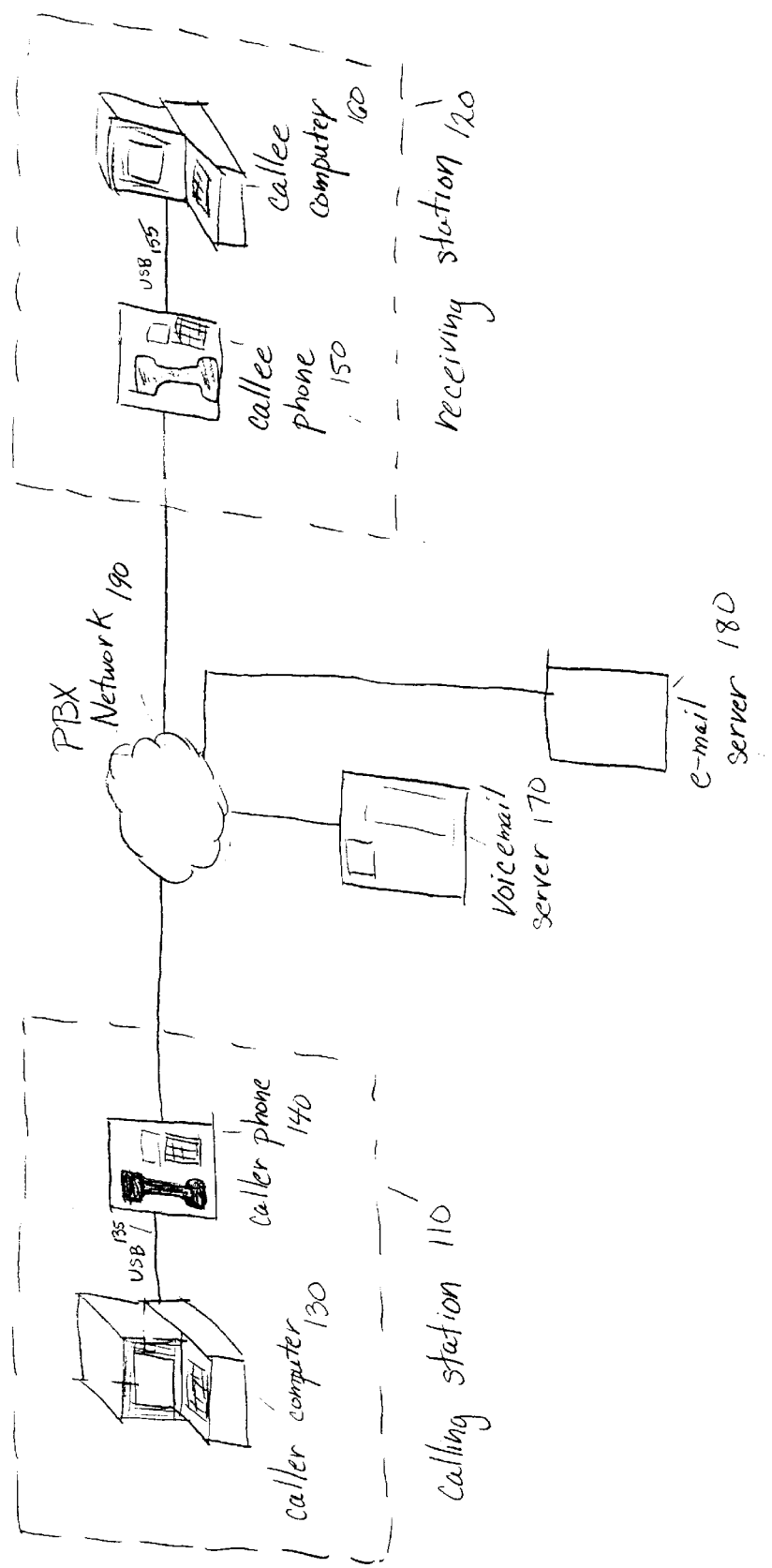
FIG. 1 is a block diagram of a system according to an embodiment of the present invention.

FIG. 1 is a block diagram of system 100 according to an embodiment of the present invention. System 100 comprises calling station 110, PBX network 190, voicemail server 170, e-mail server 180, and receiving station 120. The various components of system 100 send to each other, and receive from each other, information via PBX network 190. It is to be noted that system 100 may include other types of connections in lieu of or in addition to PBX network 190, such as, for example, a narrowband phone line connection, a broadband access line connection, a wireless connection, or a Voice over IP (VoIP) connection.

Calling station 110 comprises caller phone 140 and caller computer 130. Caller phone 140 may have both analog and digital capabilities, wherein a caller speaks into a handset of caller phone 140, the spoken words are received as an analog signal, and the analog signal is converted into digital data by caller phone 140. Caller phone 140 interfaces with caller computer 130 via Universal Serial Bus 135, or another suitable connection interface. Caller computer 130 may process digital data to generate textual information. The functions performed by caller phone 140 and caller computer 130 may be performed by one multifunctional device or multiple discrete devices.

Voicemail server 170 provides voicemail functions in system 100. Voicemail server 170 may provide conventional voicemail functions. However, voicemail server 170 may also be configured to communicate with caller phone 140 or caller computer 130. For instance, voicemail server 170 may send handshaking tones to caller phone 140, and receive handshaking tones therefrom. E-mail server 180 stores e-mail messages, and provides a platform for transmission and reception of e-mail messages to and from various components of system 100, as well as other external nodes (not shown) in remote locations. For instance, e-mail server 180 may run Microsoft Outlook server software. Voicemail server 170 and e-mail server 180 may be implemented as one server.

Receiving station 120 comprises calling phone 150 and callee computer 160 linked thereto. Callee phone 150 may interface with callee computer 160 via a USB connection 155. Callee phone 150 and callee computer 160 may be implemented in system 100 as one device.

Figure 2:
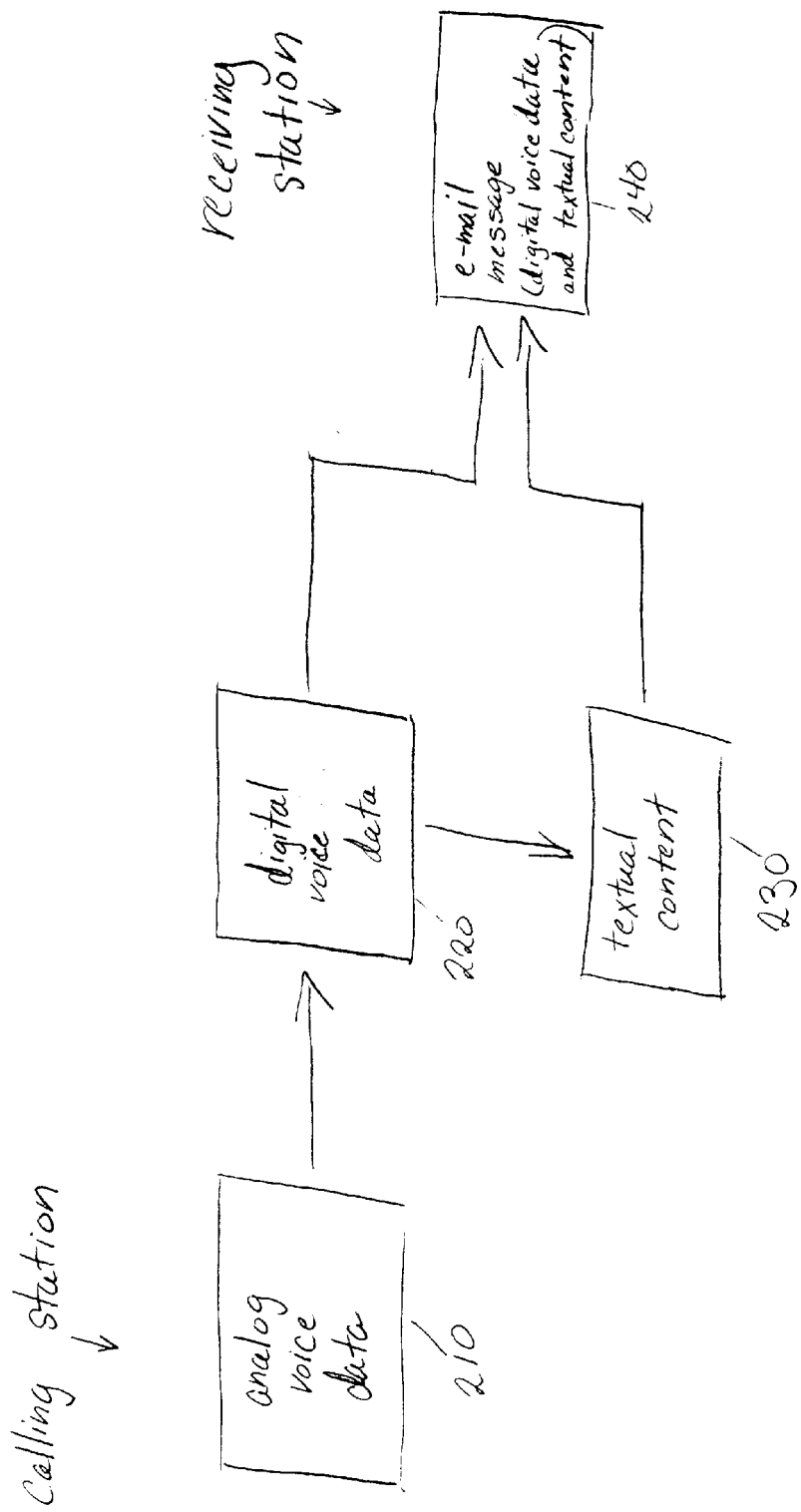
FIG. 2 is a block diagram illustrating processing of data according to the present invention.

FIG. 2 is a high-level block diagram illustrating processing of data according to the present invention. As shown, analog voice data 210 is received at calling station 110 when a caller speaks into a handset of caller phone 140. Analog voice data 210 is then converted, via analog-to-digital conversion, to digital voice data 220. Textual content 230 is extracted from digital voice data 220, and both digital voice data 220 and associated textual content 230 are placed in an e-mail message 240. E-mail message 240, which may be retrieved or received by receiving station 240, may include digital voice data 220 in the form of a wave file.

In an exemplary implementation, interaction of the components of system 100 in FIG. 1 may occur as follows. A caller at calling station 110, desiring to place a call to a callee at receiving station 120, places a call from caller phone 140. PBX network 190 routes the caller's call to callee phone 150 at receiving station 120. If the callee is present, the callee may pick up callee phone 150 and may converse with the caller calling from caller phone 140. If the callee does not pick up callee phone 150—for instance, the callee is absent or unable to get to callee phone 150 in due time—the call is forwarded to voicemail server 170. Voicemail server 170 may then send a tone to caller phone 140. Such a tone may signify to caller phone 140 that caller phone 140 should switch to another mode of operation. Caller phone 140 may then send meaningful tones back to voicemail server 170. As such, a digital handshake may occur between caller phone 140 and voicemail server 170.

Via USB connection 135, caller computer 130 may extract text from digital voice data received by caller phone 140. Caller computer 130 may also assign a digital timestamp, or other appropriate indicia, to the call. During this extraction phase, the caller's message may be received and recorded at voicemail server 170. When the caller finishes leaving the message, caller phone 140 may transfer the text extracted by caller computer 130, the timestamp, and any other indicia associated with the message to voicemail server 170.

Voicemail server 170 may then include the text, the timestamp and other indicia of the message, and a wave file containing received voice data for the message in an e-mail message in e-mail server 180. The wave file may be included as an attachment to the e-mail message. Textual information may be embedded within the e-mail message or attached thereto in a text file. The message may be placed in the callee's inbox in e-mail server 180. Accordingly, the callee may retrieve the message, which not only contains digital voice data, but also includes textual information corresponding to the message and any other indicia associated with the message. It is to be appreciated that a timestamp or other such indicia for the message need not be included in the information transmitted to voicemail server 170, or ultimately, to receiving station 120.

If caller phone 140 and caller computer 130 are not configured to perform various handshaking and extraction functions described above, then a caller from caller phone 140 may simply leave a voicemail message for a callee. Voicemail server 170 may receive digital voice data and attach such data as a wave file to an e-mail message placed in the callee's inbox of e-mail server 180. Similarly, if caller phone 140 or caller computer 130 are not functioning properly, or processing demands prevent such components from sending handshaking tones, then caller phone 140 need not respond to the handshaking tones transmitted by voicemail server 170.

Figure 3:
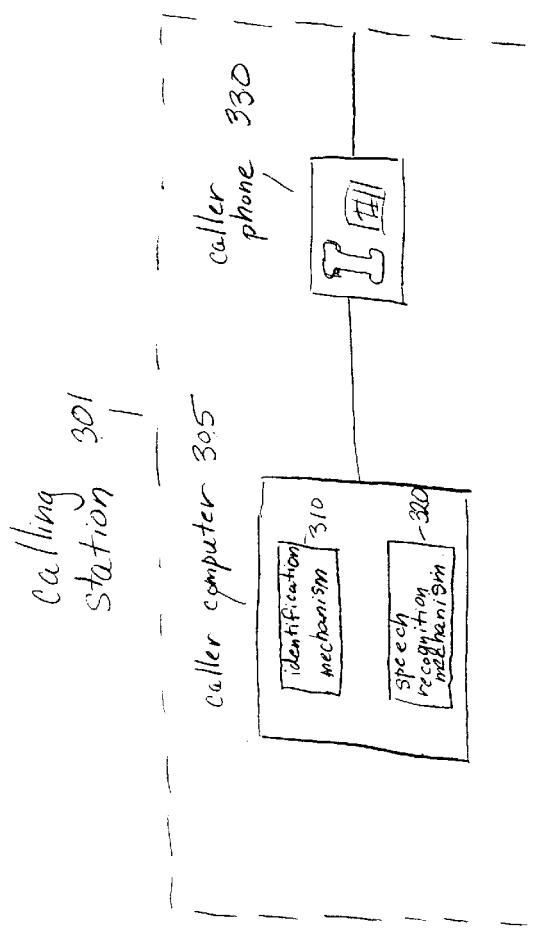
FIG. 3 is a block diagram of a calling station according to an embodiment of the present invention.

FIG. 3 is a high-level block diagram of calling station 301 according to an embodiment of the present invention. In this embodiment, calling station 301 comprises caller computer 305 and caller phone 330. Caller computer 305 may comprise identification mechanism 310 and speech recognition mechanism 320. Identification mechanism 310 and speech recognition mechanism 320 may also be implemented individually or together within caller computer 305 or within another device.

A local voice profile corresponding to a given caller may be stored at calling station 301. The local voice profile may characterize various speech properties of the caller, such as, for example, vocal track characteristics of the caller, voice characteristics of the caller, or pronunciation habits of the caller. Such speech properties may be determined by a training program, wherein a user speaks various sample words and phrases such that applicable speech processing algorithms learn to more accurately process the user's speech.

Identification mechanism 310 may determine the identity of a caller before the caller attempts to leave a message with a callee. Identification mechanism 310 may determine the identity of the caller via speaker identification methods. For instance, identification mechanism 310 may identify the caller based on her voice, and her associated local voice profile may be loaded on caller computer 305 for further processing. Speaker verification methods may also be used to determine the identity of the caller. Before dialing a callee's number, a caller may enter an identification code on a keypad of caller phone 330; the code may be processed to identify the caller. Smart-cards or biometric detectors may also be employed to identify the caller.

Speech recognition mechanism 320 may receive as input digital voice data, and may output textual content of the digital voice data. If voice data is initially in analog form, then the data may first be digitized such that speech recognition mechanism 320 may act upon such data. In other words, speech recognition mechanism 320 may transcribe spoken information encapsulated within digital voice data. Software to transcribe digital voice data to text may be prepared or purchased from a software developer, such as Dragon Systems, Inc., and incorporated into the present invention. Speech recognition mechanism 320 may load a local voice profile associated with the caller to more accurately process and transcribe the content of the caller's message. Because speech recognition may be processor-intensive, speech recognition mechanism may be located within a client computer, such as caller computer 305, as shown in FIG. 3.

Multiple local voice profiles may be stored in, or accessible to, caller computer 305 and caller phone 330. As such, caller computer 305 may, via identification mechanism 310, select from among the stored local voice profiles a particular local voice profile associated with a given caller.

FIG. 4 is a flowchart illustrating a method for providing textual content along with voice messages according to an embodiment of the present invention. In block B410, a caller places a call to a callee. In block B420, the call and a timestamp for the call are recorded as digital data. During this recording phase, the call, which may be a message left for the callee, may also be received and recorded by voicemail server 170. The call may be transcribed in block B430 to generate textual content. In block B440, the textual content and timestamp for the call may be sent to voicemail server 170. In block B450, the textual content, voice data, and time of the call are transferred to callee's computer as an e-mail message stored in e-mail server 180.

FIG. 5 is a flowchart showing a method for providing textual content along with voice messages according to another embodiment of the present invention. In block B510, a caller places a call to a callee. In block B520, the method tests whether the callee is absent from the callee's phone. If the callee is not absent, no further processing within the method occurs. If the callee is absent, then in block B530, handshaking between voicemail server 170 and calling station 301 may be performed. In block B540, a local voice profile corresponding to the caller at calling station 301 may be retrieved. Voice data representing the caller's message is recorded as digital data in block B550; recording may occur at both calling station 301 and voicemail server 170. In block B560, voice data may be transcribed via speech recognition mechanism 320, which may load the local voice profile of the caller to produce a more accurate transcription. In block B570, after the message has been transcribed, the textual content of the message may be sent to voicemail server 170. Thereafter, voicemail server 170 may send an e-mail message to a callee containing voice data, attached as a wave file, and textual content, as indicated in block B580.

The foregoing description of the preferred embodiments is provided to enable any person skilled in the art to make or use the present invention. Various modifications to these embodiments are possible, and the generic principles presented herein may be applied to other embodiments as well. For example, a message may be both recorded and transcribed at the calling station, and the calling station may forward both the textual content and a wave file to the voicemail server.

In addition, the invention may be implemented in part or in whole as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a microprocessor or other digital signal processing unit. Furthermore, speech recognition and transcription of voice data may be performed at a voicemail server, e-mail server, or receiving station, or another dedicated transcription server.

As such, the present invention is not intended to be limited to the embodiments shown above but rather is to be accorded the widest scope consistent with the principles and novel features disclosed in any fashion herein.

What is claimed is:

1. A method for providing textual content along with voice messages, comprising:

receiving a telephone call from a caller at a caller telephone;

switching the telephone call to a server if a callee is unavailable;

transmitting a first message to the caller from the server identifying that a calling station including the caller telephone should initiate voice-to-text conversion;

transmitting a second message from the calling station to the server indicating the first message, regarding initiation of the voice-to-text conversion, was received:

transforming voice data of a call to textual data using a caller's voice profile;

associating the textual data with the voice data in the calling station; and transmitting the textual and voice data to the callee.

2. The method of claim 1, wherein the transforming comprises:

digitizing the voice data of the call if the voice data is recorded in analog form to generate digital voice data; and performing speech recognition, using a speech recognition engine and the voice profile, on the digital voice data to generate the textual data.

3. The method of claim 1, further comprising recording data of the call to generate the voice data.

4. The method of claim 3, wherein the data of the call is recorded in the calling station.

5. The method of claim 1, wherein the voice data comprises digital or analog voice data.

6. The method of claim 1, wherein the caller's voice profile characterizes speech properties of the caller.

7. The method of claim 1, wherein the textual and voice data are transmitted as electronic mail to the callee.

8. The method according to claim 1, further including placing a call to a callee phone at a receiving station, wherein when the callee does not answer the call via the callee phone, a connection is established between the caller phone and the computing device and the caller provides the voice data.

9. A method, comprising:

establishing a call from a phone to a receiving station, wherein the phone is associated with a caller and coupled to a computer, and the receiving station is associated with a callee;

recording, at the phone, an analog signal of the call;

receiving, from a server, a digital signal to indicate absence of the callee at the receiving station and to identify that the computer should initiate voice-to-text transformation;

transmitting a second signal from a calling station, including the phone and the computer, to the server indicating the first message, regarding the initiation for the voice-to-text transformation, was received;

sending the recorded analog signal to the computer;

transforming, at the computer, the recorded analog signal to textual data; and sending the textual data to the server.

10. The method according to claim 9, further comprising:

determining the identity of the caller prior to the establishing;

associating the analog signal with the determined identity; and sending the identity of the caller to the computer along with the recorded analog signal.

11. The method according to claim 10, wherein the identity is determined based at least in part on speaker identification.

12. A method for a server linking a caller and a callee, comprising:

receiving, via a computer, voice data of a call placed by a caller to a callee;

transmitting the voice data to a receiving station associated with the callee;

detecting absence of the callee at the receiving station;

sending a first message to the caller if absence of the callee is detected to initiate voice-to-text transformation at a calling station;

receiving a second message from the calling station to acknowledge the first message regarding the initiation of voice-to-text transformation;

storing the voice data;

receiving, from the caller, textual data of the call; and sending the textual data and the voice data to the callee as electronic mail.

13. The method of claim 12, wherein the textual data is sent as an attachment to an electronic mail message.

14. A system for providing textual content along with voice messages, comprising:

a calling station configured to enable a caller to place a call to a callee, the call being placed via a telephone, the calling station being further configured to transmit the voice data of the call and to transform voice data of the call to textual data using a caller's voice profile;

a receiving station associated with the callee and configured to communicate with the calling station; and a server configured to communicate with the calling station and the receiving station, to transmit a first message to the caller from the server identifying a calling station should initiate voice-to-text conversion, and to receive the voice data of the call and to store the voice data of the call, the server being further configured to associate the textual data with the voice data and to transmit the textual and the stored voice data to the callee, wherein the calling station transmits a second message to the server indicating the first message, regarding the initiation of voice-to-text conversion, was received.

15. The system of claim 14, wherein the textual and voice data are transmitted to the callee as electronic mail.

16. The system according to claim 14, wherein when the call is placed to a callee phone at the receiving station and the callee does not answer the call via the callee phone, a connection is established between the caller phone and the computer and the caller provides the voice data.

17. The system of claim 15, wherein the server includes a private branch exchange (PBX).

18. A calling station for providing textual content along with voice messages, comprising:

a phone associated with a caller who places a call to a callee, the phone being configured to communicate with a receiving station associated with the callee and a server, the phone receiving a digital signal to indicate absence of the callee at the receiving station and to identify that initiation of voice-to-text transformation should begin, and the phone transmitting a second signal to the server indicating the first message, regarding the initiation of voice-to-text conversion was received; and a computer coupled to the phone, the computer having an identification mechanism and a speech recognition mechanism, the identification mechanism being configured to determine the identity of the caller, the speech recognition mechanism being configured to perform speech recognition on voice data of the call based at least in part on a retrieved local voice profile associated with the identity, the speech recognition generating textual data for the call and transmitting the textual data for the call, wherein the server transmits the textual and voice data to the callee.

19. The calling station according to claim 18, wherein when the call is placed to a callee phone at the receiving station and the callee does not answer the call via the callee phone, a connection is established between the phone and the computer and the caller provides the voice data.

20. A computer-readable medium encoded with a plurality of processor-executable instructions which when executed cause a computer to:

transmit a call to a callee phone;

receive, by a calling station associated with the caller, a first message sent by a server, the first message to indicate an absence of the callee at a receiving station associated with the callee and to identify that the calling station should initiate voice-to-text transformation;

send, by the calling station to the server, a second message to acknowledge the first message that the voice-to-text transformation should be initiated; and retrieve, at the calling station, the caller's voice profile;

transform voice data of the call to textual data using a caller's voice profile;

associate the textual data with the voice data; and transmit the textual and voice data to a callee.

21. The computer-readable medium of claim 20, wherein the transforming comprises:

digitizing the voice data of the call if the voice data is recorded in analog form to generate digital voice data; and performing speech recognition, using a speech recognition engine and the local voice profile, on the digital voice data to generate the textual data.

22. The computer-readable medium of claim 21, further comprising processor-executable instructions which when executed cause the computer to record data of the call to generate the voice data.

23. The computer-readable medium of claim 20, wherein the textual data is sent to the callee embedded in an electronic mail message.

24. The computer-readable medium of claim 20, further comprising the processor-executable instructions which when executed cause the computer to place the call to a callee phone at a receiving station, wherein when the callee does not answer the call via the callee phone, a connection is established between the caller phone and the computing device and the caller provides the voice data.

25. A method for providing textual content along with voice messages, comprising:

receiving a telephone call from a caller at a caller telephone;

switching the telephone call to a server if a callee is unavailable;

recording voice data of the telephone call at both the server and at a calling station including the caller telephone before transforming the voice data;

transforming, at the calling station, the recorded voice data of the recorded telephone call to textual data using a caller's voice profile;

transmitting the textual data to the server; and associating the textual data for the recorded voice data with the recorded voice data in the server.

26. The method of claim 25, wherein the transforming comprises:

digitizing the voice data of the call if the voice data is recorded in analog form to generate digital voice data; and performing speech recognition, using a speech recognition engine and the local voice profile, on the digital voice data to generate the textual data.

* * * * *